United States Patent [19]

Sotolongo

[11] 4,091,231
[45] May 23, 1978

[54] ADJUSTABLE FLOOR RECEPTACLE

[75] Inventor: Thomas J. Sotolongo, Red Bank, N.J.

[73] Assignee: Thomas & Betts Corporation, Elizabeth, N.J.

[21] Appl. No.: 782,532

[22] Filed: Mar. 29, 1977

[51] Int. Cl.² .................................. H02G 3/22
[52] U.S. Cl. .............................. 174/48; 174/57; 169/48
[58] Field of Search ................ 174/48, 49, 57; 220/3.7; 52/220, 221; 169/48, 49

[56] References Cited

U.S. PATENT DOCUMENTS

| | | | |
|---|---|---|---|
| 2,811,574 | 10/1957 | Guerrero | 174/57 |
| 2,811,575 | 10/1957 | Guerrero | 174/57 |
| 3,433,886 | 3/1969 | Myers | 174/57 |
| 3,646,244 | 2/1972 | Cole | 174/57 |
| 3,803,341 | 4/1974 | Klinkman et al. | 174/48 |
| 3,864,883 | 2/1975 | McMarlin | 174/48 X |
| 3,932,696 | 1/1976 | Fork et al. | 174/48 |
| 3,995,102 | 11/1976 | Kohaut | 174/48 |

Primary Examiner—J. V. Truhe
Assistant Examiner—David A. Tone
Attorney, Agent, or Firm—David Teschner; Jesse Woldman

[57] ABSTRACT

An adjustable floor receptacle includes a comparmentalized construction provided with fire barriers and partitions arranged to insure electrical and mechanical isolation between discrete power and communication cables terminating therewithin.

16 Claims, 13 Drawing Figures

U.S. Patent May 23, 1978 Sheet 3 of 4 4,091,231
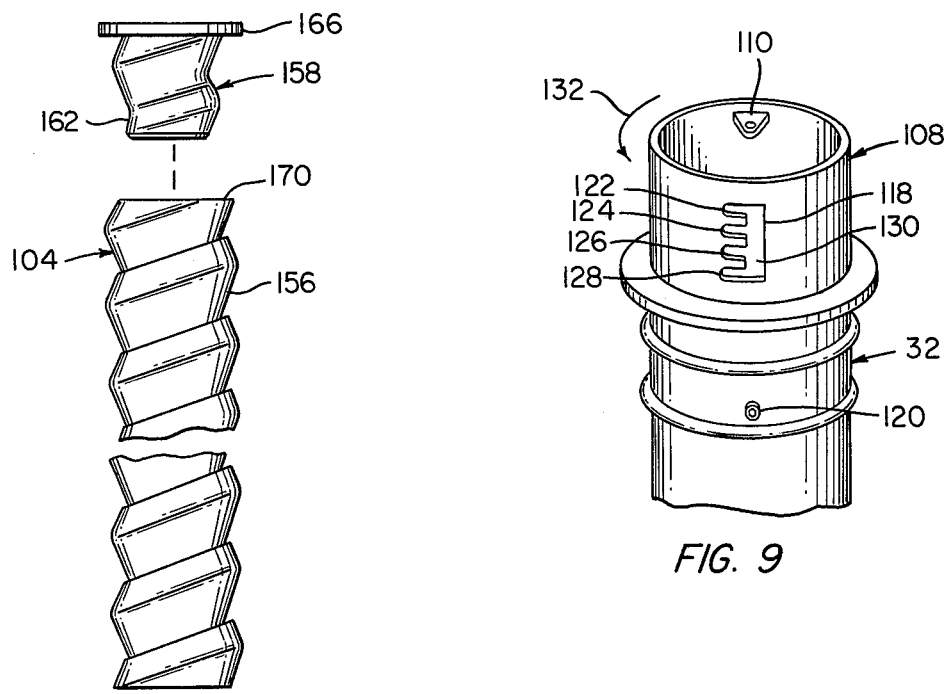
FIG. 8
FIG. 9
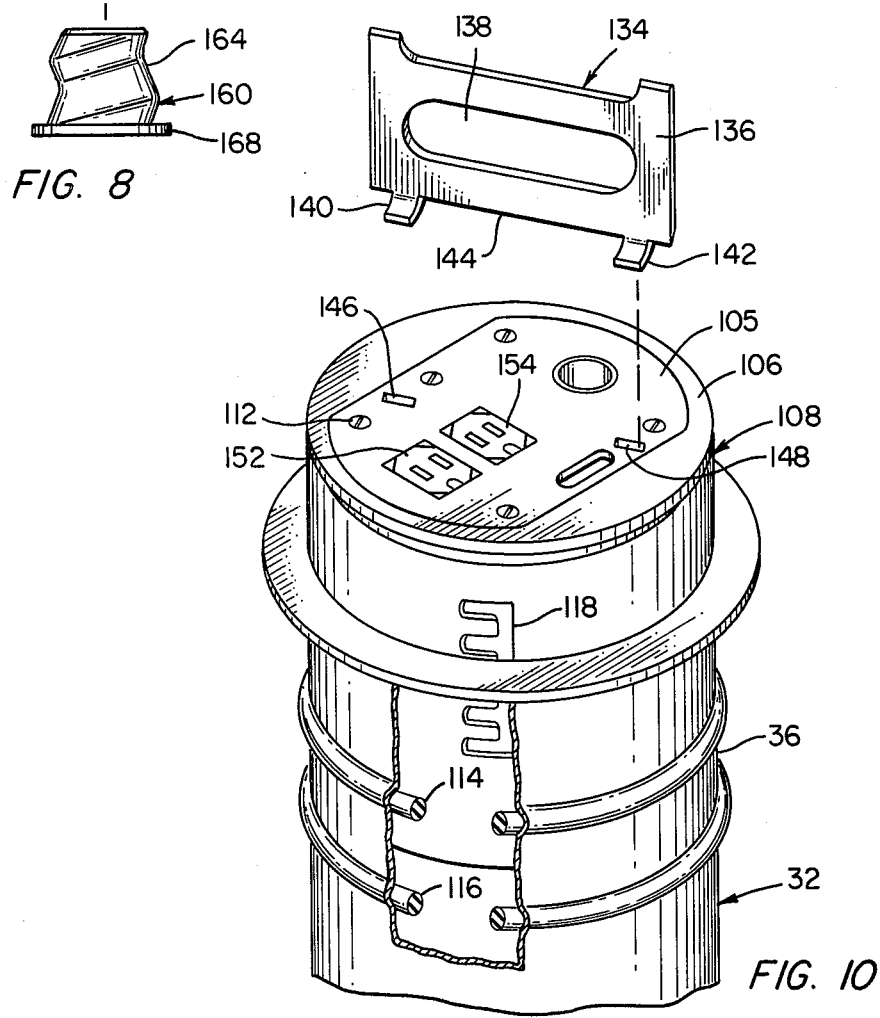
FIG. 10

ADJUSTABLE FLOOR RECEPTACLE

BACKGROUND OF THE INVENTION

1. Field of the Invention

The invention is directed to the field of wiring devices and particularly to an improved floor mounted receptacle.

2. Description of the Prior Art

Various prior art adjustable floor receptacle devices are exemplified in the following patents: U.S. Pat. No. 754,414 issued Mar. 15, 1904 to Bossert; U.S. Pat. No. 2,811,574 issued Oct. 29, 1957 to Guerrero; U.S. Pat. No. 3,433,886 issued Mar. 18, 1969 to Myers; and U.S. Pat. No. 3,646,244 issued Feb. 29, 1976 to Cole. The use of intumescent material to provide a fire retardant barrier in connection with an underfloor access housing is disclosed in U.S. Pat. No. 3,864,883 issued Feb. 11, 1975 to McMarlin. In each of the above devices, however, the electrical cables are brought into the device through a common opening and run together to the point of termination at the respective receptacles. Thus, in the event of fire or other condition which may cause an elevated temperature within the wiring device, none of the above mentioned devices provides protective isolation between the respective cables or, in the case of the adjustable floor receptacles, is there provided a fire retardant barrier designed to isolate the upper portion of the receptacle from the lower portion thereof in order to preserve the fire retardant properties of the concrete floor within which the device is located. Furthermore, with the increasing use of underfloor wiring of both power and communication cables which must be terminated in readily accessible floor outlets, there is a need for providing both electromagnetic and electrostatic shielding between such cables within the termination area to avoid unwanted or spurious crosstalk and signal transfer. This need is not provided by the prior art receptacles as exemplified by the aforementioned devices so that their use in such applications is severely limited.

SUMMARY OF THE INVENTION

The invention overcomes the limitations and difficulties noted above with respect to such prior art devices by providing, in an adjustable floor receptacle assembly, a fire retardant barrier and a partitioned and compartmentalized construction which is more reliable, effective, and more versatile than such prior art devices. A receptacle plate having openings for receiving preferably both power and communication outlets is mounted on a cylindrical sleeve slidable on seal rings disposed within the interior of a cylindrical housing which is arranged to fit within a vertical opening in a concrete floor or the like. Interposed between the lower end of the housing and a depending extension member is at least one annular disk formed from intumescent material confined between upper and lower support plates and arranged to expand and close off the openings between the lower and upper portions of the device when subjected to an elevated temperature such as may be experienced in the event of fire, thus providing a fire retardant barrier commensurate with that provided by the concrete floor prior to the introduction of the opening required to receive the device. The extension member is divided into two longitudinally extending compartments by the introduction therein of a partition which terminates at the lower end of the housing intermediate selectively located cable receiving openings which are aligned with the extension member compartments. Overlying one of the cable receiving openings in the housing is a first guide tube telescopingly matable with a flexible second guide tube depending downwardly from the receptacle receiving plate to provide a continuously enclosed passageway between the extension member and the receptacle plate. The guide tubes are fabricated from metallic material to advantageously provide both electrical and mechanical isolation for the contained cable. The housing is provided with a locking screw selectively engageable with a series of interconnected recesses formed within the outer wall of the sleeve to releasably lock the sleeve within the housing to permit slidable adjustment of the sleeve and receptacle plate at any one of a number of given positions either flush with or above the upper surface of the housing. The housing is further provided with an outturned flange or shoulder arranged to bear against the adjacent surface of the floor or other structural member within which the device is mounted. To further secure the device in place, there is provided a clamping member encircling the extension member and having extending arm portions having parts thereon for adjustable contact with the undersurface of the floor or other supporting structural member. The seal rings which are interposed between the sleeve and housing provide a water resistant barrier between the upper and lower portions of the device, which device may further be provided with a compressible seal element overlying the receptacle plate and held in place by a preferably metallic cover overlying the seal element and coupled to the receptacle plate to provide a completely sealed enclosure. It is, therefore, an object of this invention to provide an improved adjustable floor receptacle.

It is another object of this invention to provide isolated cable guides in an adjustable floor receptacle.

It is further object of this invention to provide a compartmented adjustable floor receptacle.

It is yet another object of this invention to reinstitute the fire retardance integrity of a concrete floor in which an adjustable floor receptacle is mounted.

It is still a further object of this invention to provide a watertight assembly in an adjustable floor receptacle.

It is yet a further object of this invention to provide an adjustable floor receptacle having a fire retardant barrier activated by elevated temperatures to isolate the upper portion from the lower portion of the device.

Other objects and features will be pointed out in the following description and claims and illustrated in the accompanying drawings which disclose, by way of example, the principle of the invention and the best mode contemplated for carrying it out.

BRIEF DESCRIPTION OF THE DRAWINGS

In the drawings:

FIG. 8 is an exploded elevational view showing further details of the upper flexible guide tube of the device of FIG. 1.

FIG. 9 is a fragmentary perspective view of the sleeve and housing assembly of the device of FIG. 1.

FIG. 10 is a fragmentary perspective view, partly cut away and partly in section, showing a manner of adjustment of the sleeve portion of the device of FIG. 1.

Similar elements are given similar reference characters in each of the respective drawings.

DESCRIPTION OF THE PREFERRED EMBODIMENTS

Figure 1:
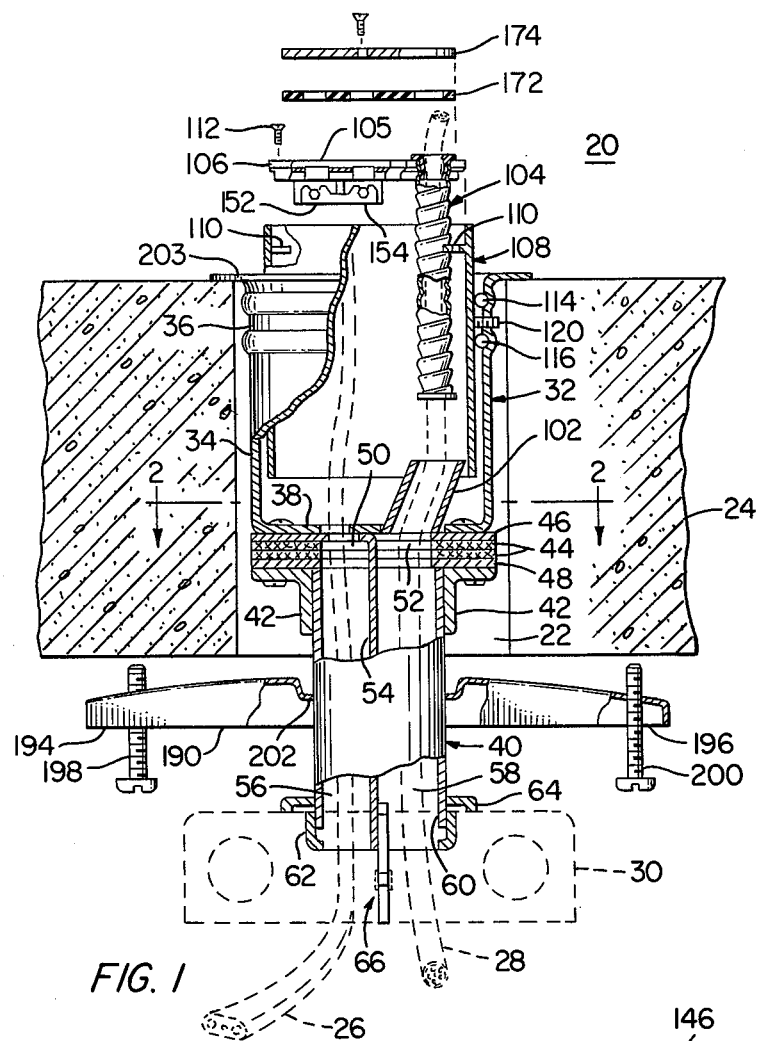
FIG. 1 is a partly exploded front elevational view, partly in section and partly cut away, of an adjustable floor receptacle constructed in accordance with the concepts of the invention.
Figure 2:
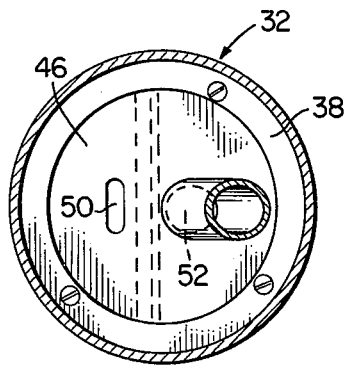
FIG. 2 is a top plan view, partly in section, taken along the line 2—2 of FIG. 1.
Figure 3:
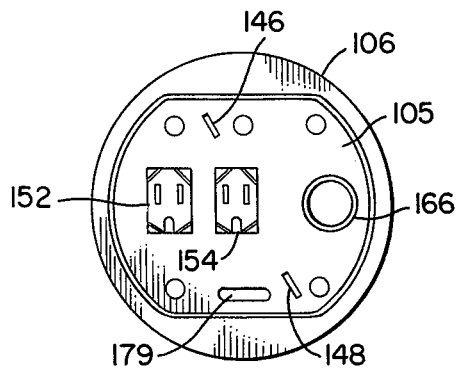
FIG. 3 is a top plan view of an upper portion of the device of FIG. 1.
Figure 4:
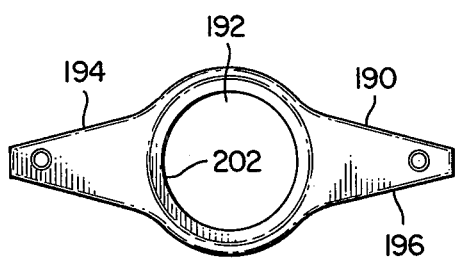
FIG. 4 is a top plan view of the clamping member of the device of FIG. 1.
Figures 5, 6, 7:
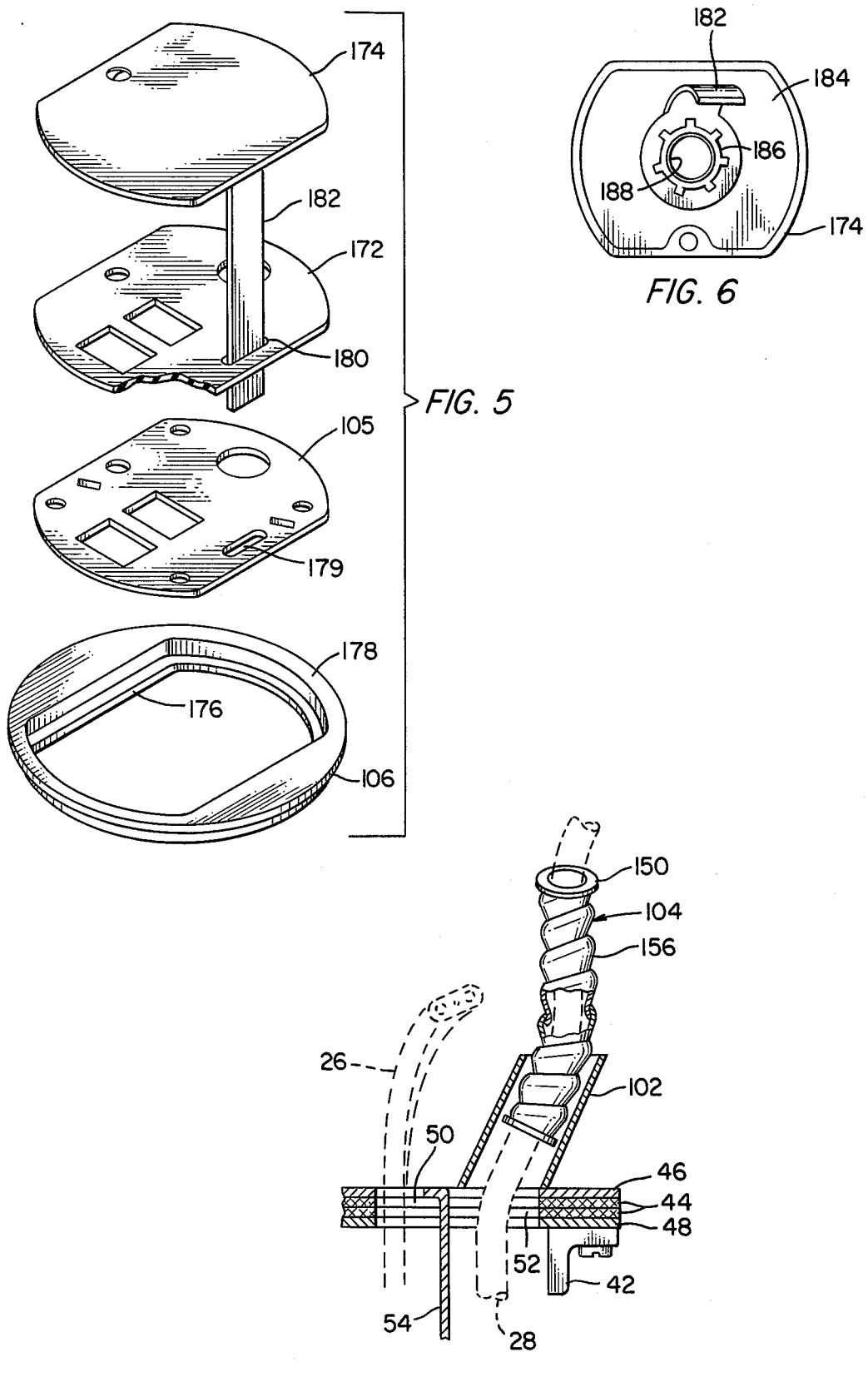
FIG. 5 is an exploded perspective view, partly cut away, of several parts of the upper portion of the device of FIG. 1.
FIG. 6 is a bottom plan view of a cover member of an adjustable floor receptacle constructed in accordance with the concepts of the invention.
FIG. 7 is a fragmentary front elevational view, partly in section and partly cut away, showing the guide tube portions of the device of FIG. 1.
Figure 11:
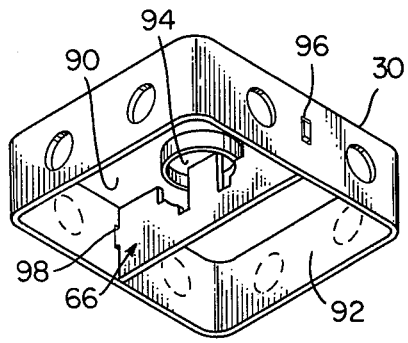
FIG. 11 is a perspective view of a junction box including a divider plate constructed in accordance with the concepts of the invention.
Figure 12:
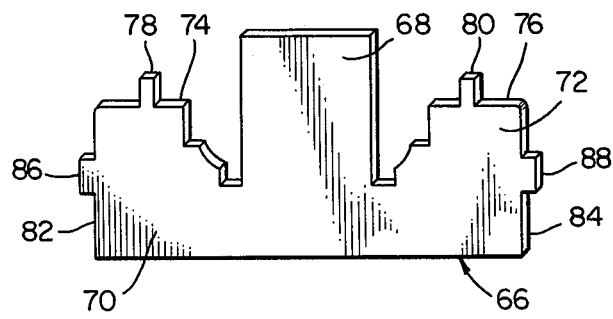
FIG. 12 is a side elevational view of the divider plate of FIG. 11.
Figure 13:
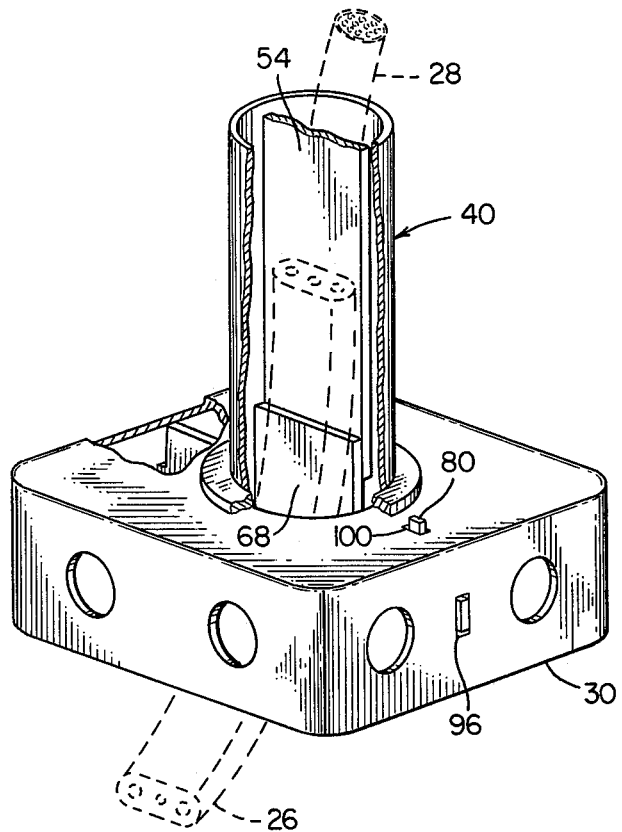
FIG. 13 is a perspective view, partly cut away and partly in section, showing a compartmentalized arrangement of the lower portion of the device of FIG. 1.

Turning now to FIGS. 1 through 10 there is shown an adjustable electrical service fitting assembly 20 (FIG. 1) constructed in accordance with concepts of the invention and fitted within an opening 22 in a concrete floor 24 to provide electrical service from an underfloor wiring system shown partly by the cables 26 and 28 entering a junction box 30 shown in dotted outline in FIG. 1. The fitting assembly 20 comprises a cylindrical housing 32 having a first or lower end 34 and a second or upper end 36, the lower end 34 having an inturned rim 38 to which is coupled an extension member 40 by means of a flange 42. Intermediate the rim 38 and the extension member 40 is disposed at least one annular heat expandable disk 44 formed from intumescent material and confined between an upper and a lower support plate, 46 and 48, respectively, the upper support plate 46, the lower support plate 48, and the disk 44 each being suitable apertured to provide coincident transverse openings shown generally at 50 and 52 to permit the insertion therethrough of cables 26 and 28. Longitudinally disposed within the extension member 40 is a metallic partition 54 dividing the extension member 40 into two discrete compartments 56 and 58, compartment 56 communicating with the openings 50 and compartment 58 communicating with the openings 52. The extension member 40 terminates in a lower end portion 60 to which may be coupled a collar portion 62 to support the junction box 30. A locking nut 64 may be assembled to the end portion 60 of the extension member 40 to lock the junction box 30 against the collar portion 62. It may be appreciated that at least the lower end 60 of the extension member 40 may be suitably externally threaded to receive the parts 62 and 64 which may comprise similarly internally threaded components adapted to mate with the threads on the extension member 40. A continuation of the partitioned compartments 56 and 58 into the junction box 30 may be accomplished by the attachment of a divider plate 66 within the junction box 30 as shown, for example, in FIGS. 11, 12 and 13. The divider plate 66 is shown as provided with a centrally disposed partition element 68 (FIG. 12) flanked on either side by shoulder portions 70 and 72, each of which includes an upper edge 74, 76, respectively, from which extends a tab portion 78, 80, respectively, and a side edge 82, 84, respectively, from which extends a tab portion 86, 88, respectively. The divider plate 66 may be advantageously employed to divide the junction box 30 into two discrete compartments 90 and 92 (FIG. 11) when mounted substantially as shown in FIG. 11. As illustrated, the plate 66 is placed within the box 30 so that the partition element 68 extends through the top opening 94 in the box 30 which is provided with side slots 96 and 98 for receiving the tabs 86 and 88 of the plate 66. The tabs 78 and 80 of the plate 66 will then protrude through suitable openings in the top of the box 30, one of such openings being shown in FIG. 13 at 100. The plate 66 may thus be locked in place by twisting or bending the tabs 78 and 80 out of their original plane. The partition element 68 will then be located directly adjacent the partition 54, as shown in FIG. 13, to effectively provide a continuation of the partition 54 within the box 30. Returning now specifically to FIG. 1, the fitting assembly 20 further includes a first guide tube 102 overlying the openings 52 at the lower end of the housing 32 and attached preferably to the support plate 46. The tube 102 is arranged to telescopingly mate with a second guide tube 104 coupled to an apertured plate member 105 seated within an adapter ring 106 which is fastened to a cylindrical sleeve 108 by way of flanges 110 which are suitably internally threaded (not shown) to receive mounting screws such as indicated at 112. The sleeve 108 is slidably mounted in the housing 32, the outer surface of the sleeve 108 being arranged to contact and bear against a pair of spaced seal ring elements 114 and 116 disposed within the interior of the housing 32 generally in the area of its upper end 36. The elements 114 and 116 are constructed preferably from a resilient material such as rubber or neoprene to provide a moisture-proof seal between the sleeve 108 and the housing 32 while providing a good bearing surface to permit the sleeve 108 to be freely adjusted longitudinally within the housing 32. With the apertured plate member 105 in place atop the sleeve 108, the sleeve 108 may be freely moved from a lower position in which the plate member 105 is essentially flush with the top of the housing 32 to various other extended positions in which the plate member 105 is situated at a given height above the top of the housing 32. The sleeve 108 is further provided with a series of interconnected recesses 118 (FIG. 9) formed within the exterior wall thereof and which are arranged to receive a projecting portion of a threaded member such as a screw 120 when the sleeve 108 is suitably positioned within the housing 32. The recesses 118 comprise individually spaced horizontally extending segments 122, 124, 126, and 128, each communicating with a common longitudinally extending segment 130. In the initial assembly of the device 20, the screw 120 is backed off sufficiently to permit the sleeve 108 to be freely inserted in the housing 32 to the required depth. The sleeve 108 is then rotated in position so that the recessed segment 130 is aligned with the screw 120. The screw 120 is then advanced sufficiently to insure that its internally projecting end is seated loosely within the segment 130. The sleeve 108 may then be slidably vertically adjusted within the range of the segment 130 to a desired height and then rotated in the direction of the arrow 132 to cause the projecting end of the screw 120 to enter a coinciding one of the recessed segments 122 through 128, thereby preventing further vertical movement of the sleeve 108. The screw 120 may then be advanced to lock the sleeve 108 in the previously established position. To facilitate the vertical and rotational movement of the sleeve 108 in the assembled condition as shown in FIG. 10, there is provided a key member 134 which may be formed or blanked from flat metallic stock and includes a handle portion 136 having an opening 138 for convenient grasp during manipulation. A pair of spaced tabs 140 and 142 depend from a lower edge 144 of the key member 134 and are arranged to fit within a pair of similarly spaced slots 146 and 148 in the plate member 105 which is coupled to the sleeve 108. Each of the tabs 140 and 142 is formed with a bent end portion arranged to engage the underside of the plate number 105 when the key member 134 is held in a vertical position to prevent slippage of the tabs 140 and 142 from within the slots 146 and 148 when the key member 134 is employed to vertically manipulate the sleeve 108. As further illustrated in FIG. 7, during movement of the sleeve 108, the second guide tube 104 is telescopingly engaged within the first guide tube 102 to provide a continuous enclosure about the cable 28 which has previously been fed therethrough for termination adjacent the upper end 150 of the second guide tube 104. The cable 28 is thus effectively mechanically and electrically isolated from the cable 26 which has been fed through the openings 50 for termination at receptacles 152 and 154 (FIG. 1). Thus, where the cable 28 functions as a communication cable such as a telephone cable or the like, the conductors therein are isolated from the conductors of the cable 26 which may comprise a power cable of the type generally employed in commercial or residential wiring systems. This feature may be found highly advantageous where it is desirable or necessary to insure that any shorting or arcing condition which may occur in the power cable 26 is not transmitted to the communication cable 28. To further insure registration of the second guide tube 104 with the first guide tube 102 during manipulation of the sleeve 108, the second guide tube 104 is suitably constructed so as to flex about its longitudinal axis. In the embodiment shown in FIGS. 7 and 8, the second guide tube 104 comprises a body portion 156 which is formed from a narrow strip of metallic material wound in an overlapping helical pattern to effectively provide a series of displaceable segments forming a cylindrical tube. The second guide tube 104 may thus slide freely within the first guide tube 102 while assuming the necessary angular disposition coincident with the central axis of the first guide tube 102. As further illustrated in FIG. 8, the guide tube 104 may be provided at either end with hollow separable end caps 158 and 160 each of which may be similarly constructed to include a threaded shank portion 162, 164, respectively, which may be threaded into the interior of the body portion 156 and which terminates in an enlarged shoulder portion 166, 168, respectively. Thus, the guide tube 104 may be coupled to the plate member 105 by placing the shank portion 162 of cap 158 through a suitable opening in the plate member 105 and then threading the cap 158 into one end of the tube 104, until the plate member 105 is securely captured between the shoulder 166 of the cap 158 and the adjacent edge 170 of the tube body portion 156. The other cap 160 is threaded into the other end of the body portion 156 to provide a smooth cable receiving entryway thereat. FIG. 5 is an exploded view showing the adaptor ring 106, the plate member 105, and further elements including a seal member 172 formed preferably of resilient non-porous material such as rubber or neoprene, and a preferably metallic cover member 174. The adaptor ring 106 includes an internal shoulder 176 arranged to support the plate member 105, and an external flange 178 arranged to seat on the exposed edge of the sleeve 108. The respective seal and cover members 172 and 174 may be provided to overlie, seal, and protect the components such as receptacles 152 and 154 seated within the plate member 105 from contact with deleterious substances such cleaning compounds and the like, or to prevent contact therewith during periods of non-use. As further illustrated in FIGS. 5 and 6, the plate member 105 and the seal member 172 are each provided with a slotted opening 179, 180, respectively, for receiving a flexible tongue member 182 attached to the underside 184 of the cover member 174 by means of a lockring 186 engaged to a shank 188 integral with the underside of the cover member 174. The tongue member 182 serves as a hinge and restraining member for the cover member 174 and the seal member 172 as they are unlocked and flapped over together to expose the plate member 105. As further illustrated in FIGS. 1 and 4, the fitting 20 includes a clamp member 190 having a central opening 192 flanked by extending arm portions 194 and 196 each of which is provided with a respective adjusting screw 198, 200, respectively. As shown in FIG. 1, the extension member 40 extends within the central opening 192 of the member 190 which is securely held thereto by means of internal edges 202 defining the perimeter of the opening 192 and arranged to bear against the outer wall of the extension member 190. In the course of assembly, the fitting assembly 20 is placed within the opening 22 in the floor 24, which opening 22 is selectively chosen to have a diameter sufficient to freely receive the assembly 20 but sufficiently restricted to prevent the inclusion of a flange 203 extending radially outwardly from the top edge of the housing 32, which flange 203 then rests on the upper surface of the floor 24 and the screws 198 and 200 advanced until contact is made with the floor 24. The fitting assembly 20 is thus held securely between the upper and lower surfaces of the floor 24 for subsequent use. Removal of the assembly 20 for repair, replacement, or otherwise, is accomplished simply by loosening the screws 198 and 200, removing the clamp member 190, and withdrawing the remaining portion of the assembly 20 from the opening 22. In the case of fire occuring, for example, in the area adjacent the undersurface of the floor 24, the disk 44, which is constructed of intumescent material, will tend to foam and expand when subjected to the elevated temperature and, in the course of such expansion, will fill the void between the outer perimeter of the disk or disks 44 and the adjacent interior surface of the opening 22 in the floor 24, and will simultaneously fill and close off the openings 50 and 52 while surrounding the cables 26 and 28, thus providing a fire retardant barrier between the upper and lower portions of the fitting assembly 20 and substantially reinstating the original fire retardant characteristics of the concrete floor 24.

The embodiments of the invention in which an exclusive property or privilege is claimed are defined as follows:

1. An adjustable electrical service fitting assembly comprising: a cylindrical housing having a first end and a second end; a cylindrical sleeve slidably disposed within said housing and having a first end and a second end; annular seal ring elements disposed between said housing and said sleeve to provide seal means there between; a tubular extension member coupled at one end to said first end of said housing and aligned in coaxial relationship therewith; at least one heat expandable annular disk interposed between said extension member and said first end of said housing, said disk being arranged to provide a fire resistant barrier between the respective openings in said extension member and said housing when exposed to an elevated temperature; an elongate metallic partition longitudinally disposed in said extension member to longitudinally divide the interior of said extension member into two separate compartments; a first guide tube coupled adjacent said first end of said housing and having a first end and a second end, said first end of said first guide tube communicating with one of said compartments of said extension member, said second end of said first guide tube opening into the interior of said housing to provide an enclosed passageway between said extension member and said housing; an apertured plate member disposed adjacent said second end of said sleeve and coupled thereto to provide mounting means for one or more electrical receptacles; a second guide tube coupled to said plate member and having a first end, a second end, and a body portion therebetween, said first end of said second guide tube being coupled to said plate member so that said body portion extends into said sleeve, said body portion having a given length arranged to permit said second end of said second guide tube to telescopingly mate with said first guide tube to provide a continuous enclosure about a cable extending within said first guide tube and said second guide tube; and means coupled to said extension member for locking said fitting to a structural member.

2. A fitting assembly as defined in claim 1 wherein said heat expandable annular disk comprises intumescent material.

3. A fitting assembly as defined in claim 1 wherein said body portion of said second guide tube comprises a series of displaceable segments arranged to permit said body portion to both twist and flex about its longitudinal axis.

4. A fitting assembly as defined in claim 1 wherein said first guide tube comprises a rigid wall portion.

5. A fitting assembly as defined in claim 1 wherein said body portion of said second guide tube is arranged to slidably fit within said first guide tube.

6. A fitting assembly as defined in claim 1 wherein said means for locking said fitting to a structural member comprises an elongate metalic part having a central opening for receving said extension member, and extending arms each of which is provided with a threaded element arranged to be threadably adjusted for engagement with an adjacent surface of such structural member.

7. A fitting assembly as defined in claim 1 further comprising an end cap removably coupled to said second end of said second guide tube and cooperative with said plate member to releasably couple said second guide tube to said plate member.

8. A fitting assembly as defined in claim 7 wherrein said end cap comprises an externally threaded shank portion threadably engaged within said guide tube.

9. A fitting assembly as defined in claim 1 further comprising an adaptor ring releasably coupled to said second end of said sleeve and having a shouldered central opening, said plate member being disposed within said central opening in said adaptor ring.

10. A fitting assembly as defined in claim 1 wherein said sleeve further comprises a series of interconnected recessed portions extending longitudinally along the outer surface thereof, said housing further comprising a threaded member exending radially inwardly through the wall of said housing for engagement with a selective one of said recessed portions to releasably lock said sleeve in a given position within said housing.

11. A fitting assembly as defined in claim 1 wherein said extension member terminates in an end portion remote from said housing portion and having a collar portion coupled to said end portion for attachment to a junction box, said fitting assembly further including a divider plate arranged to be placed within such junction box in general alignment with said partition in said extension member to divide the interior of such junction box into two discrete compartments each of which individually communicates with a given one of said extension member compartments.

12. A fitting assembly as defined in claim 1 further comprising a cover member releasably coupled to said plate member, and a seal member conforming to the shape of said plate member and disposed intermediate said plate member and said cover member.

13. A fitting assembly as defined in claim 1 wherein said annular ring elements are located within corresponding annular recesses extending circumferentially within the interior of said housing.

14. A fitting assembly as defined in claim 13 wherein said ring elements are formed from compressible nonmetallic material.

15. A fitting assembly as defined in claim 1 wherein said heat expandable annular disk is disposed between upper and lower support plates arranged to selectively confine and control the expansion of said disk.

16. A fitting assembly as defined in claim 1 wherein said second end of said housing terminates in an annular flange portion arranged to abut an adjacent surface of a structural member within which said fitting assembly is disposed.

* * * * *

UNITED STATES PATENT AND TRADEMARK OFFICE
CERTIFICATE OF CORRECTION

PATENT NO. : 4,091,231
DATED : May 23, 1978
INVENTOR(S) : Thomas J. Sotolongo

It is certified that error appears in the above-identified patent and that said Letters Patent are hereby corrected as shown below:

Title page, Abstract, line 1 - 2, "comparmentalized" should be -- compartmentalized --.

Column 5, line 11, "grasp" should be -- grasping --.

Column 7, line 54, "receving" should be -- receiving --.

Column 8, line 8, "wherrein" should be -- wherein --.

Column 8, line 10, after "said" insert -- second --.

Column 8, line 20, "exending" should be -- extending --.

Signed and Sealed this

Thirty-first Day of October 1978

[SEAL]

Attest:

RUTH C. MASON
Attesting Officer

DONALD W. BANNER
Commissioner of Patents and Trademarks